Figure 1:
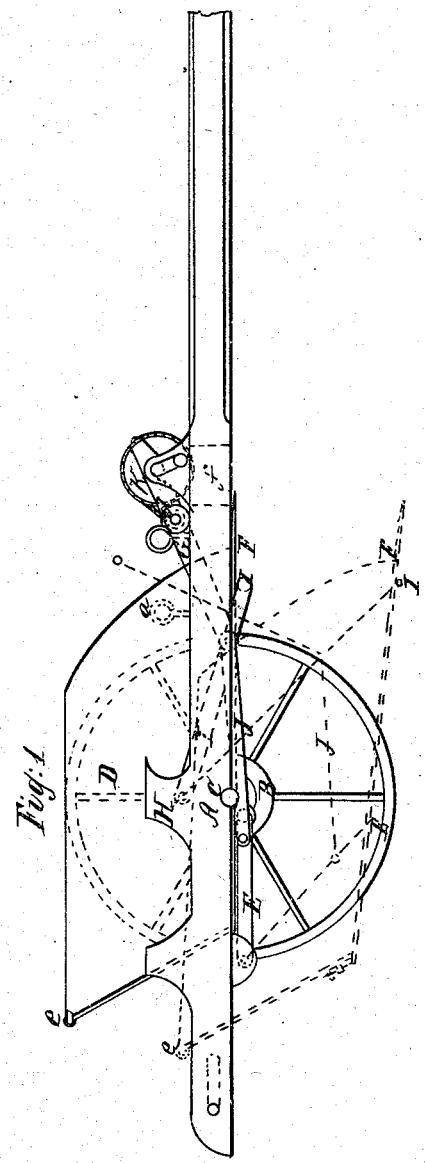

Z. Butt.
Excavator.
Nº 12,604. Patented Mar. 13, 1855.

UNITED STATES PATENT OFFICE.

ZE BUTT, OF LINCOLNTON, NORTH CAROLINA.

SELF-LOADING CART.

Specification of Letters Patent No. 12,504, dated March 13, 1855.

*To all whom it may concern:*

Be it known that I, ZE BUTT, of the town of Lincolnton, in the county of Lincolnton and State of North Carolina, have invented a new and useful Improvement in Self-Loading Carts; and I do hereby declare that the following is a full, clear, and exact description of the same, reference being had to the accompanying drawing, forming part of this specification, in which the figure is a side elevation of a self-loading cart constructed after my plan, one of the wheels being removed.

The dark lines show the position of the body when elevated. The red lines show the position the body occupies while loading itself.

Similar letters of reference indicate the same parts.

The peculiarity of this invention consists in so constructing, arranging, and combining the cart body, that the operator can drop the body of the cart to, or upon the ground, at any angle, or in any manner, that the nature of the work may require, and when so dropped to the ground, as, the cart moves forward, the body enters the loosened earth the same as a shovel, or scraper, and loads itself, and when loaded the body is elevated with great facility, and the load can be carted and dumped as an ordinary cart.

To enable others skilled in the art to make and use my invention I will proceed to describe its construction and operation.

A, represents the frame of the cart; B, the propelling wheels, the axes of which are attached to the frame A, in front of the adjustable and cranked axle E, which supports the body of the cart. The advantage, of placing the axes of the propelling wheels in front of the axle which supports the body of the cart, is, that when the body is loading, or when loaded, and brought forward, and upward, the most of the weight may rest upon the propelling wheels, instead of upon the horses.

The cranked or vibrating axle E supports the body of the cart, and is made adjustable, so that the operator can move it upward, or downward, backward or forward, by changing the holes through which the bolts or journals pass which fasten the axle to the frame. This enables the operator to drop the body of the cart to, or upon the ground at any angle, or in any manner that the nature of his work may require.

D, is the body of the cart, hung upon the shaft of the vibrating axle E or its equivalent, and is so attached as to tilt either backward, or forward. The body of the cart is open in front, so as to enter the loosened earth the same as a shovel, or scraper, and likewise has a gate behind, so that the load can be thrown out by tilting the cart backward.

I, is an adjustable catch, in shape resembling the axle E, and is bolted to the frame A, in the same manner; its office is to receive and support the front of the cart body, and to catch, and hold it, as, it falls forward, and downward, after unloading; H, H, bearings through which the bolts or journals pass, which support the parts E and I. G, regulator and supporter, it is connected together by a cross piece or rod ($d$) which is adjustable, and the ends of which rest upon the frame, A, and thus sustain and support the body while loading, and likewise regulates the depth of the body shall enter the ground. This is accomplished by moving the stop ($a$) forward or backward on the frame, A; J, J, connecting rods attached to the parts E and I, and thence to the windlass.

K, is a windlass connected to the vibrating axle, E, it draws the body of the cart upward, and forward, and thus elevates the load.

$r$, is a notch in the regulator G, which when the body is elevated catches upon the windlass shaft, and sustains the body of the cart in the position and manner shown by the dark lines in the drawing.

Manner of operating my self loading cart, as shown in the figure of the drawing: Adjust the body as before described, if required. To load the cart, release the notch or catch $r$, from its connection with the shaft of windlass, K, and the body of the cart D, drops to the ground by its own gravity, in the position shown by the red lines in the drawing. Now as the cart moves forward the front of the body enters the loosened earth the same, as, a shovel, or scraper, and being arrested, or stopped, by the back of the cart, picks up, and loads the cart. To elevate the load, tilt the back of the cart downward which elevates the point, and loosens it from the ground, then turn the windlass K, and the body is elevated to its former position. To unload the cart, tilt backward, the same as a common cart.

What I claim as my invention and desire to secure by Letters Patent is:—

The manner herein described, or any other essentially the same of constructing, arranging, combining, and operating cart bodies so that they can be dropped to, or upon the ground to receive the load, be loaded, as the cart moves forward, and then elevated, and dumped, or unloaded, the same as an ordinary cart, substantially as and for the purpose described.

ZE BUTT.

Witnesses:
W. H. MICHAL,
WM. I. HOKE.